United States Patent
Grimstad et al.

(10) Patent No.: US 10,344,919 B2
(45) Date of Patent: Jul. 9, 2019

(54) SUBSEA MODULE PRESSURE CONTROL

(75) Inventors: Haakon Jostein Grimstad, Bergen (NO); Arne Veland, Bergen (NO)

(73) Assignee: OneSubsea IP UK Limited, London (GB)

( * ) Notice: Subject to any disclaimer, the term of this patent is extended or adjusted under 35 U.S.C. 154(b) by 391 days.

(21) Appl. No.: 14/239,765

(22) PCT Filed: Aug. 16, 2012

(86) PCT No.: PCT/EP2012/066044
§ 371 (c)(1),
(2), (4) Date: Jun. 6, 2014

(87) PCT Pub. No.: WO2013/026776
PCT Pub. Date: Feb. 28, 2013

(65) Prior Publication Data
US 2014/0290753 A1    Oct. 2, 2014

(30) Foreign Application Priority Data

Aug. 19, 2011 (GB) .................................... 1114325.2

(51) Int. Cl.
*F17D 1/20* (2006.01)
*E21B 21/10* (2006.01)
(Continued)

(52) U.S. Cl.
CPC ................ *F17D 1/20* (2013.01); *E21B 21/10* (2013.01); *E21B 33/0355* (2013.01);
(Continued)

(58) Field of Classification Search
CPC ...... F17D 1/20; G05D 16/20; G05D 16/2033; E21B 33/0355; E21B 21/10; Y10T 137/2605; Y10T 137/0396
(Continued)

(56) References Cited

U.S. PATENT DOCUMENTS 4,638,444 A * 1/1987 Laragione .......... G05D 16/2033
137/487
6,273,019 B1 * 8/2001 Ciamillo, II ............ B63C 11/46
114/312

(Continued)

FOREIGN PATENT DOCUMENTS

DE    112009004397 T5    8/2012
JP    H0981241 A    3/1997
(Continued)

OTHER PUBLICATIONS

International Search Report for International Application No. PCT/EP2012/066044, filed Aug. 16, 2012.

*Primary Examiner* — Marina A Tietjen
*Assistant Examiner* — Paul J Gray
(74) *Attorney, Agent, or Firm* — Conley Rose, P.C.

(57) ABSTRACT

A method of controlling fluid pressure in a closed system including using a pressure regulating unit connected to the system, the unit including a first conduit fluidly connecting the closed system to an external system. A first regulating valve is interposed between the external system and one end of the conduit and a second regulating valve interposed between the closed system and the other end of the conduit. The method further includes: a) opening one of the first or second regulating valves; b) closing said one regulating valve; c) opening the other regulating valve; d) closing the other regulating valve; and e) repeating steps a) to d) in turn until the desired fluid pressure is achieved in the system.

7 Claims, 2 Drawing Sheets

(51) Int. Cl.
    *E21B 33/035*     (2006.01)
    *G05D 16/20*     (2006.01)

(52) U.S. Cl.
    CPC ......... *G05D 16/20* (2013.01); *G05D 16/2033* (2013.01); *Y10T 137/0396* (2015.04); *Y10T 137/2605* (2015.04)

(58) Field of Classification Search
    USPC .............................................. 137/487.5, 81.2
    See application file for complete search history.

(56) References Cited

U.S. PATENT DOCUMENTS

| | | | |
|---|---|---|---|
| 2008/0223467 A1 | 9/2008 | Tveita | |
| 2009/0053567 A1 | 2/2009 | Katano | |
| 2011/0269045 A1* | 11/2011 | Ishitoya | H01M 8/04089 |
| | | | 429/443 |

FOREIGN PATENT DOCUMENTS

| | | |
|---|---|---|
| NO | 2010082348 A1 | 7/2010 |
| WO | 2010082348 A1 | 7/2010 |

\* cited by examiner

1

SUBSEA MODULE PRESSURE CONTROL

CROSS-REFERENCE TO RELATED APPLICATIONS

This application is a 35 U.S.C. § 371 national stage application of PCT/EP2012/066044 filed Aug. 16, 2012, and entitled "Subsea Module Pressure Control," which claims priority to GB Application No. 1114325.2 filed Aug. 19, 2011 and entitled "Method; Controlling fluid pressure in closed system by alternately opening and closing two valves connected to external system" both of which are incorporated herein by reference in their entirety for all purposes.

FIELD OF THE INVENTION

The present disclosure relates to a method of controlling fluid pressure in a closed system. It is useful in the field of hydrocarbon exploration and particularly in subsea oil and gas pumping applications. It can also be used topside and for other more general applications in which the control of pressure in fluids is required. A corresponding apparatus and a tool for carrying out the method of the disclosure are also described.

BACKGROUND

In high pressure fluid systems such as are common in hydrocarbon exploration and recovery, pressure differences between parts of a system can be extremely large which can prevent valves opening easily. It can also be unsafe to open valves, particularly large valves, across which there is a very high pressure differential because the sudden change in pressure can cause failures in seals or in other components of such systems. Preferably pressure differences in high pressure systems are kept within specified limits and thus there is a need for improved methods and apparatus for accurately and reliably regulating pressure in parts of a system.

There is a particular need for accurate and highly controllable pressure regulation in subsea pump systems which are filled with barrier fluids at a higher pressure than the process fluids they are pumping so as to prevent process fluid leaking out. Instead barrier fluid will bleed through seals into the process fluid. The pressure of the barrier fluid must be carefully controlled and kept within a predetermined pressure envelope, i.e. between safe minimum and maximum values.

In subsea systems such pressure regulation is usually effected from the surface through an umbilical and therefore there can be a time delay involved, especially in deep water high pressure offshore hydrocarbon field developments which are becoming more common. This delay makes it more difficult to effectively control pressures.

It is also sometimes desired to take measurements or perform tests at particular pressures and hence it is desirable to be able to adjust the pressure in a system in a controlled manner so as to achieve and maintain the desired pressure accurately.

SUMMARY

According to one aspect of the present disclosure there is provided a method of controlling fluid pressure in a closed system, the method comprising: using a pressure regulating unit connected to the system, the regulating unit comprising a first valve connected to a second valve by a conduit; wherein the method comprises the following steps:
A) opening the first valve;
B) closing the first valve;
C) opening the second valve;
D) closing the second valve;
E) repeating steps A) to D) in turn until the desired pressure is achieved in the closed system.

According to a second aspect of the present disclosure there is provided apparatus for controlling fluid pressure in a closed system, the apparatus comprising: a pressure regulating unit connected to the system, the pressure regulating unit comprising a first valve connected to a second valve by a conduit; and a control unit arranged to carry out the following steps:
A) opening the first valve;
B) closing the first valve;
C) opening the second valve;
D) closing the second valve;
E) repeating steps A) to D) in turn until the desired pressure is achieved in the closed system.

According to a third aspect of the disclosure there is provided a tool for controlling fluid pressure in a closed system, the tool comprising: a pressure regulating unit; means for connecting the pressure regulating unit to the system; wherein the pressure regulating unit comprises a conduit having a first valve at one end and a second valve at an opposite end; and a control unit adapted to carry out the following steps:
A) opening the first valve;
B) closing the first valve;
C) opening the second valve;
D) closing the second valve;
E) repeating steps A) to D) in turn until the desired pressure is achieved in the closed system.

Preferably the tool comprises a high pressure quick-connect connector for coupling it to the system, and it may be adapted to be carried by a remotely operated vehicle.

Preferably the pressure regulating unit is connected in parallel to the closed system.

Alternatively the pressure regulating unit may be connected between the closed system and a reservoir.

According to a preferred embodiment the control unit comprises an electronic control unit, which may be programmed with computer software adapted to open and subsequently to close the first valve and then the second valve in turn, and repeat until the desired pressure is achieved in the system.

The disclosure is applicable to any fluid such as liquid, gas or a multiphase fluid, although with gas or multiphase fluid more valve operations are likely to be needed to achieve a specified increase/decrease or pressure.

The volume in the conduit between the two valves does not need to be known although if the volume is known then a pressure/volume calculation can be performed before the operation is carried out. In this way the necessary number of valve operations can be predicted.

BRIEF DESCRIPTION OF THE DRAWINGS

For a better understanding of the disclosure and to show how the same may be carried into effect, reference is made to the accompanying drawings in which.

DETAILED DESCRIPTION OF THE DRAWINGS

In each figure a closed fluid system 1 is illustrated, which may for example be a subsea oil pumping station. The closed pressurized fluid system 1 is represented by the area within broken lines and contains a volume of fluid at a system pressure P1. A pump module 2 is shown within the closed system 1, by way of example, but it does not form part of the invention since the invention can be applied to other modules performing many other processes in a closed system.

A first system valve SV1 and a second system valve SV2 isolate the fluid of the closed system 1, at system pressure P1, from the fluid external to the closed system 1 which is at a different external pressure P3. A pressure regulating unit 3 is connected across the second system valve SV2 such that one end of the unit 3 is fluidly connected to that side of the second system valve SV2 which is at system pressure P1, and the other end of the unit 3 is fluidly connected to that side of the second system valve SV2 which is at the external pressure P3.

The pressure regulating unit 3 comprises two regulating valves RV1 and RV2 connected by a conduit 4. The conduit 4 has a volume of fluid between the first regulating valve RV1 and the second regulating valve RV2 and this is at a conduit pressure P2. For most practical applications the volume of the conduit 4 is substantially smaller than the volume of fluid in the closed system 1. However the method will work for any ratios of the volume of the conduit 4 and the closed volume. The volume of fluid outside the closed system 1 is substantially larger than that in the closed system 1 so that the external pressure P3 is not influenced to any significant order by the volume in the conduit 4, i.e. is substantially unaffected by equalization with the conduit volume.

Generally the pressure P1 in system 1 and the external pressure P3 will be known from existing pressure sensors. A sensor can optionally be placed between the regulating valves RV1 and RV2 to monitor the conduit 4. This has the advantage that it can help to detect if one of the valves is leaking but it is not necessary for the method of the disclosure.

Figure 1:
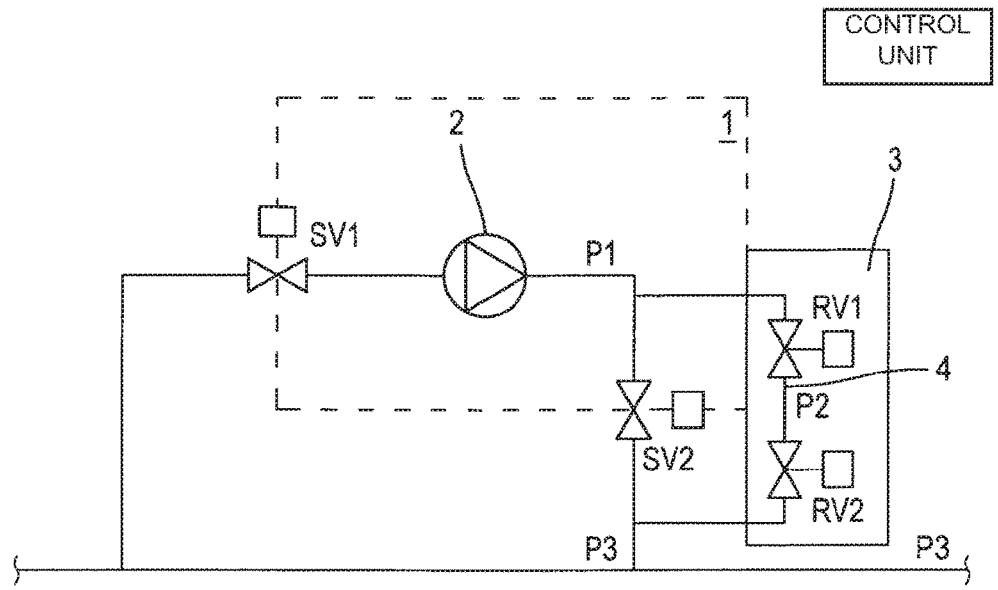
FIG. 1 is a schematic representation of a closed pressurized system to illustrate a first embodiment of the disclosure.

The method of the disclosure as applied to FIG. 1 will now be described in two examples, firstly for the situation in which the closed system 1 is at a high pressure and it is desired to depressurize it, and secondly for the situation in which the closed system is at a low pressure and it is desired to increase the pressure.

All valves SV1, SV2, RV1 and RV2 are initially closed so that the fluid in the closed system 1 is isolated. The first regulating valve RV1 separates the system pressure P1 from the conduit pressure P2. The second regulating valve RV2 separates the conduit pressure P2 from the external pressure P3.

The trapped volume of fluid in the system 1, between system valves SV1 and SV2 is at a system pressure P1. This is substantially higher than the external pressure P3 which is a lower pressure and it is desired to depressurize the closed system 1 to bring system pressure P1 to be equal to external pressure P3.

Opening the first regulating valve RV1 equalizes the system pressure P1 with the conduit pressure P2. The first regulating valve RV1 is then closed and the second regulating valve RV2 is subsequently opened to equalize the conduit pressure P2 and the external pressure P3, i.e. decrease the conduit pressure P2 to make it equal to external pressure P3. The second regulating valve RV2 is then closed and the steps are repeated. When the first regulating valve RV1 is opened a second time, system pressure P1 will drop slightly as it equalizes to the now lower conduit pressure P2. Opening the second regulating valve RV2 a second time reduces the conduit pressure P2 again slightly, and in this way it can be seen that the system pressure P1 P1 can be incrementally decreased until it reaches a desired pressure, which may be equal to the external pressure P3 or a desired pressure between the system pressure P1 and the external pressure P3.

The trapped volume of fluid between the system valves SV1 and SV2 in system 1 is at system pressure P1 which is substantially lower than the external pressure P3 which is a high pressure. It is desired to increase the system pressure P1 to make it substantially equal to the external pressure P3.

In this case the second regulating valve RV2 is opened to equalize the conduit pressure P2 and the external pressure P3. The second regulating valve is then closed and the first valve RV1 is subsequently opened to equalize the conduit pressure P2 and the system pressure P1, i.e. to increase system pressure to conduit pressure P2. The first regulating valve RV1 is then closed. The steps are then repeated. When the second regulating valve RV2 is opened a second time, conduit pressure P2 is again increased as it equalizes with the higher external pressure P3. Opening regulating valve RV1 a second time increases the system pressure P1 slightly as it equalizes the now higher conduit pressure P2. In this way it can be seen that the system pressure P1 is incrementally increased until it reaches the desired pressure.

Preferably the regulating valves RV1 and RV2 are smaller valves than the system valves SV1 and SV2, which has the advantage that all movements of valves with differential pressures can be done with relatively small valves.

Figure 2:
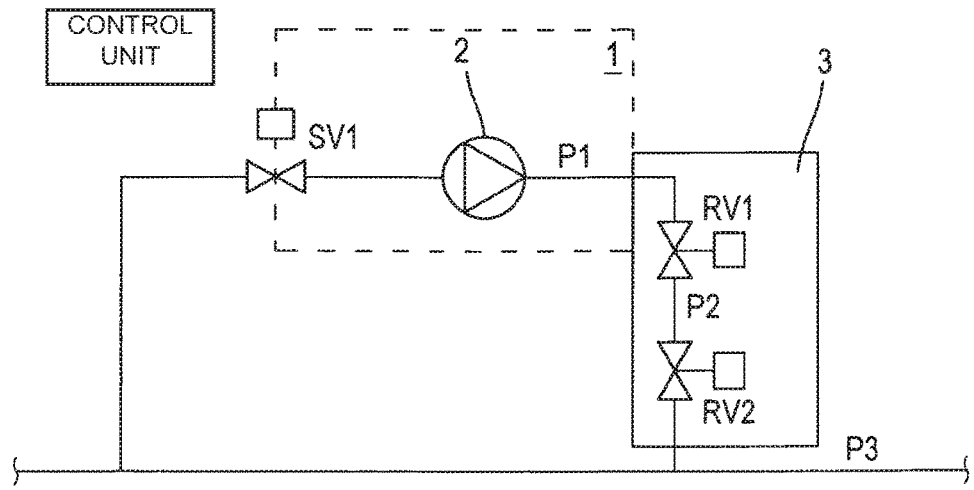
FIG. 2 is a schematic representation of a closed pressurized system to illustrate a second embodiment of the disclosure.

The system of FIG. 2 operates in a corresponding manner as described above for FIG. 1 but in this case the pressure regulating unit 3 is used directly to pressurize or depressurize the closed system 1 rather than to equalize the pressure on each side of a valve as in FIG. 1.

Figure 3:
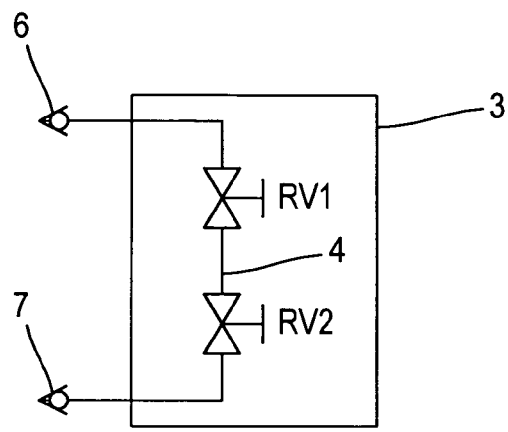
FIG. 3 is a schematic representation of a closed pressurized system to illustrate a third embodiment of the disclosure.

FIG. 3 shows a standalone tool exemplifying one aspect of the disclosure. This tool can be connected and disconnected to a closed system, such as system 1, as required, and the same method steps are followed to either pressurize or depressurize the closed system. The tool comprises a pressure regulating unit 3 corresponding to that shown in FIGS. 1 and 2 but comprising two hot stab or quick-connect coupling points 6 and 7. These allow the tool to be connected and disconnected to a system relatively easily and quickly and ensure that the tool locks effectively onto the system before any valve is opened and pressure released.

The tool can be carried by a remote operated vehicle (ROV) (which are frequently used in sub-sea applications), particularly when it is to be connected to a deep water system.

Figure 4:
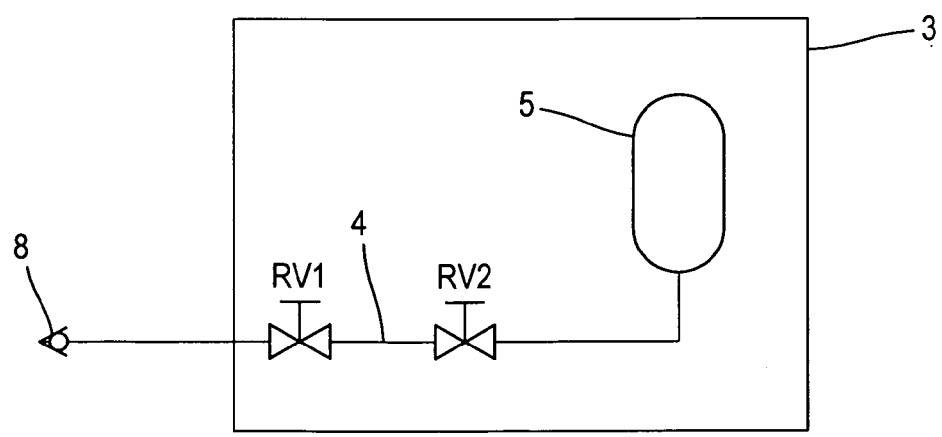
FIG. 4 is a schematic representation of a closed pressurized system to illustrate a fourth embodiment of the disclosure.

FIG. 4 illustrates an alternative embodiment of a tool which can be connected to a closed system at a single point, via quick-connect hot stab connector 8, rather than at the two points required for the tool of FIG. 3. This tool comprises a pressure regulating unit 3 with regulating valves RV1 and RV2 separated by the conduit or pipe 4 and a reservoir or accumulator 5 attached to the other side of the second regulating valve RV2. The accumulator 5 may be integral with the tool or may be separate, for example it may be kept topside in a subsea application. The accumulator 5 may be a low pressure reservoir to drain, i.e. depressurize, a high pressure system, or it may be a high pressure reservoir to pressurize a low pressure system. In both cases the pressure range can be increased using a plurality of accumulators with different pre-charged pressures connected with a valve arrangement.

An alternative to use of one or more accumulators, as shown in FIG. 4, is to use a downline from topside, for example via an umbilical, to supply the external pressure supply.

The accumulator or umbilical may be omitted by connecting the second regulating valve RV2 directly to seawater. This would be applicable not only to the tool of FIG. 4 but also to a permanent installation as in FIG. 1. For example, in FIG. 1, the connection from the second regulating valve RV2 to the external system at pressure P3, could instead be made directly to seawater pressure. Similarly, in the tool of FIG. 4, the connection from the second regulating valve RV2 could be made directly to seawater instead of to the reservoir 5.

The volume between the regulating valves RV1 and RV2 in the conduit pipe 4, and the number of times the valves RV1 and RV2 are opened and closed, will be chosen to be appropriate to the application and the actual and relative pressures involved. The number of valve operations sequences required is given by the ratio of the volume trapped between system valves SV1 and SV2 in the closed system 1, and that trapped between regulating valves RV1 and RV2 in the conduit 4. For example, for very high pressures the conduit 4 may be smaller, i.e. be narrower and/or shorter to reduce its volume, the valves will be smaller to reduce the risk of leakages across closed valves and the number of times they are opened and closed will generally be more.

The invention claimed is:

1. An apparatus for controlling fluid pressure in a subsea closed system, the apparatus comprising:
   a subsea pressure regulating unit connected to the subsea closed system, the subsea pressure regulating unit comprising a fluid conduit fluidly connecting the subsea closed system to an external system;
   a first regulating valve interposed between the external system and one end of the fluid conduit and a second regulating valve interposed between the subsea closed system and another end of the fluid conduit defining a trapped volume in the fluid conduit; and
   a control unit configured to:
      a) open either of the first or second regulating valves to equalize to a first pressure in the trapped volume;
      b) close said one regulating valve;
      c) open the other regulating valve to equalize to a second pressure in the trapped volume;
      d) close the other regulating valve; and
      e) repeat steps a) to d) in turn to incrementally equalize the trapped volume pressure until a desired fluid pressure is achieved in the subsea closed system, wherein in a first case, a pressure in the subsea closed system is greater than a pressure in the trapped volume prior to step a), and wherein in a second case, a pressure in the subsea closed system is less than a pressure in the trapped volume prior to step a).

2. The apparatus according to claim 1 wherein the regulating unit is configured to be connected in parallel to the closed system.

3. The apparatus according to claim 1 wherein the regulating unit is configured to be connected in series between the closed system and a reservoir.

4. The apparatus according to claim 1 wherein the control unit is configured to first open and close the first regulating valve when used for depressurization of the closed system or the external system.

5. The apparatus according to claim 1 wherein the control unit is configured to first open and close the second regulating valve when used for pressurization of the closed system or the external system.

6. The apparatus according to claim 1 further comprising a high pressure quick-connect coupling configured to connect to the closed system.

7. The apparatus according to claim 1 wherein the control unit is further configured to:
   receive an indication of a pressure in the closed system and an indication of a pressure in the external system;
   as a result of the pressure in the closed system being greater than the pressure in the external system, open the second regulating valve in step a); and
   as a result of the pressure in the closed system being less than the pressure in the external system, open the first regulating valve in step a).

* * * * *